United States Patent
Demuth et al.

(10) Patent No.: US 8,839,185 B2
(45) Date of Patent: Sep. 16, 2014

(54) METHOD FOR GENERATING A TRANSPORT TRACK THROUGH A SOFTWARE SYSTEM LANDSCAPE AND COMPUTER SYSTEM WITH A SOFTWARE SYSTEM LANDSCAPE AND A TRANSPORT TRACK

(75) Inventors: Michael Demuth, Rauenberg (DE);
Volker Schulz, Heppenheim (DE);
Herbert Stegmuller, Bruchsal (DE)

(73) Assignee: SAP AG, Walldorf (DE)

( * ) Notice: Subject to any disclaimer, the term of this patent is extended or adjusted under 35 U.S.C. 154(b) by 1527 days.

(21) Appl. No.: 11/262,143

(22) Filed: Oct. 27, 2005

(65) Prior Publication Data
US 2006/0123392 A1 Jun. 8, 2006

(30) Foreign Application Priority Data
Oct. 27, 2004 (EP) .................................... 04025505

(51) Int. Cl.
*G06F 9/44* (2006.01)
*G06F 9/445* (2006.01)
*H04L 12/701* (2013.01)
*H04L 12/725* (2013.01)

(52) U.S. Cl.
CPC .............. *H04L 45/302* (2013.01); *H04L 45/00* (2013.01); *G06F 8/60* (2013.01); *G06F 8/71* (2013.01)
USPC ........... 717/101; 717/106; 717/120; 717/121; 717/174

(58) Field of Classification Search
CPC ............. G06Q 10/06; G06F 8/30; G06F 8/60; G06F 8/61; G06F 8/71
See application file for complete search history.

(56) References Cited

U.S. PATENT DOCUMENTS

| 5,237,688 A | 8/1993 | Calvert et al. |
| 5,495,610 A | 2/1996 | Shing et al. |

(Continued)

FOREIGN PATENT DOCUMENTS

| JP | 2001265603 | 9/2001 |
| WO | WO-0163482 A2 | 8/2001 |
| WO | WO-03060718 A1 | 7/2003 |

OTHER PUBLICATIONS

B. Richards, RTP: a transport layer implementation project, 2001, 8 pages.*

(Continued)

*Primary Examiner* — Thuy Dao
(74) *Attorney, Agent, or Firm* — Schwegman Lundberg & Woessner, P.A.

(57) ABSTRACT

A method for generating a transport track for routing transport requests through a software system landscape comprising a central control system and a plurality of logical systems interconnected by logical transport paths, a transport request defining a software service to at least one of the code and the data of a system in the landscape, is described. The method includes selecting a group of systems for a software service project according to a project definition; analyzing in the central system the transport paths between the systems of the group for finding a suitable route through all systems of the group; and generating in the central system a transport track according to the analysis, the transport track defining a route for transport requests through all systems of the group in a particular order, the transport track specifying one source system in which software services are permitted, pairs of adjacent interconnected systems, and at least one target system.

12 Claims, 5 Drawing Sheets

(56) References Cited

U.S. PATENT DOCUMENTS

| | | | |
|---|---|---|---|
| 5,608,721 A | 3/1997 | Natarajan et al. | |
| 5,745,767 A | 4/1998 | Rosen et al. | |
| 5,845,090 A | 12/1998 | Collins, III et al. | |
| 5,859,977 A | 1/1999 | Nishiyama et al. | |
| 5,860,007 A | 1/1999 | Soni et al. | |
| 5,953,533 A | 9/1999 | Fink et al. | |
| 6,110,228 A | 8/2000 | Albright et al. | |
| 6,256,773 B1* | 7/2001 | Bowman-Amuah | 717/121 |
| 6,263,358 B1 | 7/2001 | Lee et al. | |
| 6,308,173 B1 | 10/2001 | Glasser et al. | |
| 6,405,364 B1* | 6/2002 | Bowman-Amuah | 717/101 |
| 6,513,132 B1 | 1/2003 | Suzuki | |
| 6,606,744 B1* | 8/2003 | Mikurak | 717/174 |
| 6,662,357 B1* | 12/2003 | Bowman-Amuah | 717/120 |
| 6,718,535 B1* | 4/2004 | Underwood | 717/101 |
| 7,020,690 B1 | 3/2006 | Haitsuka et al. | |
| 7,107,331 B2 | 9/2006 | Gava et al. | |
| 7,721,257 B2 | 5/2010 | Demuth et al. | |
| 7,725,891 B2 | 5/2010 | Demuth et al. | |
| 7,853,651 B2 | 12/2010 | Demuth et al. | |
| 7,877,730 B2 | 1/2011 | Demuth et al. | |
| 7,926,056 B2 | 4/2011 | Lier et al. | |
| 8,069,435 B1* | 11/2011 | Lai | 717/106 |
| 8,234,621 B2* | 7/2012 | Killisperger et al. | 717/101 |
| 2001/0052074 A1 | 12/2001 | Pensak et al. | |
| 2002/0026592 A1 | 2/2002 | Gavrila et al. | |
| 2002/0103851 A1 | 8/2002 | Kikinis | |
| 2002/0129356 A1 | 9/2002 | Hellerstein et al. | |
| 2002/0156798 A1 | 10/2002 | Larue et al. | |
| 2002/0169878 A1 | 11/2002 | Orenshteyn | |
| 2002/0174164 A1 | 11/2002 | Hayashi | |
| 2002/0184398 A1 | 12/2002 | Orenshteyn | |
| 2002/0198725 A1 | 12/2002 | Piepenbrink et al. | |
| 2003/0040974 A1 | 2/2003 | Chauvin et al. | |
| 2003/0084350 A1 | 5/2003 | Eibach et al. | |
| 2003/0093516 A1 | 5/2003 | Parsons et al. | |
| 2003/0142627 A1 | 7/2003 | Chiu et al. | |
| 2004/0010708 A1 | 1/2004 | Johnson et al. | |
| 2004/0060044 A1 | 3/2004 | Das et al. | |
| 2004/0073720 A1 | 4/2004 | Clough et al. | |
| 2004/0081183 A1 | 4/2004 | Monza et al. | |
| 2004/0117795 A1* | 6/2004 | Wang et al. | 718/106 |
| 2004/0267935 A1 | 12/2004 | Patiejunas | |
| 2005/0080888 A1 | 4/2005 | Walter | |
| 2005/0209732 A1 | 9/2005 | Audimoolam et al. | |
| 2005/0210501 A1 | 9/2005 | Zigmond et al. | |
| 2006/0026278 A1 | 2/2006 | Yu | |
| 2006/0080653 A1 | 4/2006 | Siwatu et al. | |
| 2006/0112189 A1 | 5/2006 | Demuth et al. | |
| 2006/0117311 A1 | 6/2006 | Demuth et al. | |
| 2006/0123392 A1* | 6/2006 | Demuth et al. | 717/120 |
| 2006/0123407 A1 | 6/2006 | Demuth et al. | |
| 2006/0143614 A1 | 6/2006 | Lier et al. | |
| 2006/0149813 A1 | 7/2006 | Janik | |
| 2006/0155832 A1 | 7/2006 | Demuth et al. | |
| 2006/0164257 A1 | 7/2006 | Giubbini | |
| 2006/0203812 A1 | 9/2006 | Demuth et al. | |
| 2007/0038610 A1 | 2/2007 | Omoigui | |
| 2007/0233854 A1 | 10/2007 | Bukovec et al. | |
| 2008/0183840 A1 | 7/2008 | Khedouri et al. | |
| 2010/0058287 A1 | 3/2010 | Sundararajan et al. | |

OTHER PUBLICATIONS

Dangelmaier et al., CIDP—on workflow-based client integration in complex client oriented design projects, Apr. 1999, 6 pages.*

Bawtree, Hugh, "A tool for managing change; Software Development", XP-002321302, (Aug. 2000),18 pgs.

Dabrowski, C , et al., "Understanding self healing in service discovery systems", XP-002323534, 6 pgs.

Hodgson, Alan , "Intel eBusiness Engineering Release Management and Application Landing", XP-002321303 *Intel Technology Journal*, Q4, (2000),1-9.

IBM Document Center, "Publication information", XP-2325608, (Observed Apr. 21, 2005),1 pg.

Szallies, Constantin , "On Using the Observer Design Pattern", XP-002323533, (Aug. 21, 1997),9 pgs.

"U.S. Appl. No. 11/261,816, Advisory Action mailed Jul. 28, 2009", 3 pgs.

"U.S. Appl. No. 11/261,816, Final Office Action mailed May 14, 2009", 11 pgs.

"U.S. Appl. No. 11/261,816, Non-Final Office Action mailed Dec. 30, 2008", 14 pgs.

"U.S. Appl. No. 11/261,816, Notice of Allowance mailed Sep. 28, 2009", 11 Pgs.

"U.S. Appl. No. 11/261,816, Response filed Mar. 18, 2009 to Non-Final Office Action mailed Dec. 30, 2008", 15 pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,043, Non-Final Office Action mailed Oct. 27, 2009", 11 Pgs.

"U.S. Appl. No. 11/262,343, Advisory Action mailed Jun. 30, 2009", 5 pgs.

"U.S. Appl. No. 11/262,343, Final Office Action mailed Apr. 27, 2009", 11 pgs.

"U.S. Appl. No. 11/262,343, Non-Final Office Action mailed Sep. 14, 2009", 16 Pgs.

"U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,343, Response filed Jun. 15, 2009 to Final Office Action mailed Apr. 27, 2009", 12 pgs.

"U.S. Appl. No. 11/262,343, Response filed Dec. 4, 2009 to Non Final Office Action mailed Sep. 14, 2009", 12 pgs.

"U.S. Appl. No. 11/262,442, Non-Final Office Action mailed Jan. 7, 2009", 16 pgs.

"U.S. Appl. No. 11/262,442, Non-Final Office Action mailed Aug. 31, 2009", 18 pgs.

"U.S. Appl. No. 11/262,442, Response filed Apr. 27, 2009 to Non Final Office Action mailed Jan. 7, 2009", 17 pgs.

"U.S. Appl. No. 11/262,442, Response filed Nov. 18, 2009 to Non Final Office Action mailed Aug. 31, 2009", 13 pgs.

"U.S. Appl. No. 11/262,543, Advisory Action mailed Jul. 1, 2009", 3 pgs.

"U.S. Appl. No. 11/262,543, Final Office Action mailed Apr. 27, 2009", 13 pgs.

"U.S. Appl. No. 11/262,543, Non-Final Office Action mailed Dec. 30, 2008", 11 pgs.

"U.S. Appl. No. 11/262,543, Notice of Allowance mailed Sep. 15, 2009", 10 Pgs.

"U.S. Appl. No. 11/262,543, Pre-Appeal Brief Request mailed Jul. 20, 2009", 5 pgs.

"U.S. Appl. No. 11/262,543, Response filed Mar. 9, 2009 to Non-Final Office Action mailed Dec. 30, 2008", 14 pgs.

"U.S. Appl. No. 11/262,543, Response filed Jun. 15, 2009 to Final Office Action mailed Apr. 27, 2009", 11 pgs.

IBM Corporation, *Tivoli software distribution users guide 4.1*, (636 pages) XP-002321301 Relevant pgs, as per Dr. Verhasselt—For matters 78EP04, 78EP05, 78EP06: pp. 251, 262, 407, 436, 439, 443. For matter 78EP07: pp. 5, 10, 11, 163, 176, 177; for matter 78EP10: pp. 1, 4, 12, 251, 252, 449, 450, 452, 577., (2001), 1, 4, 5, 10, 11, 12, 251, 252, 262, 407, 436, 439, 443, 449, 450, 452, 577.

IBM Corporation, *IBM Tivoli Configuration Manager—User's Guide for Software Distribution—Version 4.2*, XP-2325607, (Oct. 2002), 1-358.

McFarland Metzger, Sue S, "SAP R/3 change and transport management : the official SAP guide / (SAP R/3—Systemlandschaft Implementieren und warten)", XP-002325774, (Jan. 12, 2000), 419, 461, 465.

Schneider-Neureither, Andreas (ED), "SAP System Landscape Optimization", *SAP Press*, 2004, ISBN 1-59229-026-4, (2004), 73-78; 96-100.

"U.S. Appl. No. 11/261,816, Notice of Allowance mailed Jan. 12, 2010", 5 pgs.

(56) References Cited

OTHER PUBLICATIONS

"U.S. Appl. No. 11/261,816, Supplemental Examiner Interview Summary filed Nov. 11, 2009", 7 pgs.

"U.S. Appl. No. 11/262,043, Notice of Allowance mailed Aug. 12, 2010", 14 pgs.

"U.S. Appl. No. 11/262,043, Response filed Jan. 21, 2010 to Non Final Office Action mailed Oct. 27, 2009", 10 pgs.

"U.S. Appl. No. 11/262,326, Final Office Action mailed Oct. 13, 2010", 12 pgs.

"U.S. Appl. No. 11/262,326, Non-Final Office Action mailed Apr. 26, 2010", 13 pgs.

"U.S. Appl. No. 11/262,326, Notice of Allowance mailed Dec. 13, 2010", 10 pgs.

"U.S. Appl. No. 11/262,326, Response filed Jul. 26, 2010 to Non Final Office Action mailed Apr. 26, 2010", 13 pgs.

"U.S. Appl. No. 11/262,326, Response filed Nov. 9, 2010 to Final Office Action mailed Oct. 13, 2010", 13 pgs.

"U.S. Appl. No. 11/262,343, Appeal Brief filed Jun. 22, 2010", 26 pgs.

"U.S. Appl. No. 11/262,343, Decision on Pre-Appeal Brief mailed Jun. 3, 2010", 2 pgs.

"U.S. Appl. No. 11/262,343, Examiner Interview Summary mailed Nov. 9, 2009", 3 pgs.

"U.S. Appl. No. 11/262,343, Examiner's Answer mailed Oct. 8, 2010", 19 pgs.

"U.S. Appl. No. 11/262,343, Examiner's Answer to Appeal Brief mailed Sep. 16, 2010", 18 pgs.

"U.S. Appl. No. 11/262,343, Final Office Action mailed Mar. 9, 2010", 16 pgs.

"U.S. Appl. No. 11/262,343, Pre-Appeal Brief Request filed Apr. 15, 2010", 5 pgs.

"U.S. Appl. No. 11/262,442, Final Office Action mailed Apr. 19, 2010", 8 pgs.

"U.S. Appl. No. 11/262,442, Notice of Allowance mailed Sep. 10, 2010", 9 pgs.

"U.S. Appl. No. 11/262,442, Response filed Jun. 9, 2010 to Final Office Action mailed Apr. 19, 2010", 16 pgs.

"U.S. Appl. No. 11/262,543, Decision on Pre-Appeal Brief Request mailed Aug. 20, 2009", 2 pgs.

"U.S. Appl. No. 11/262,543, Examiner Interview Summary mailed Aug. 17, 2009", 2 pgs.

"U.S. Appl. No. 11/262,543, Notice of Allowance mailed Jan. 7, 2010", 5 pgs.

"U.S. Appl. No. 11/262,343, Appeal Decision mailed Oct. 11, 2013", 9 pgs.

\* cited by examiner

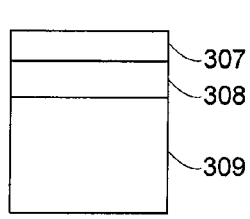
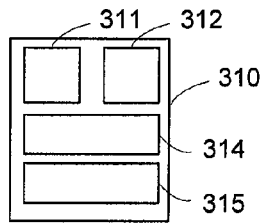
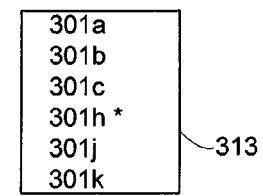
FIG. 3B
PRIOR ART
FIG. 3C
FIG. 3D
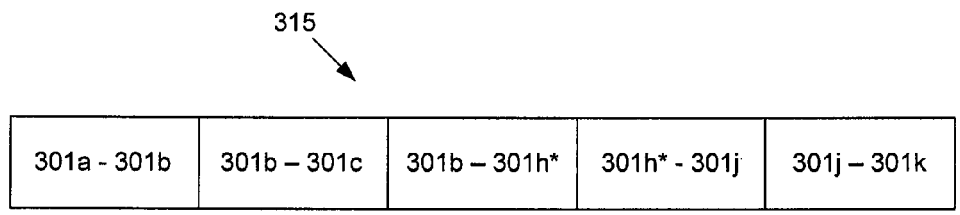
FIG. 3E
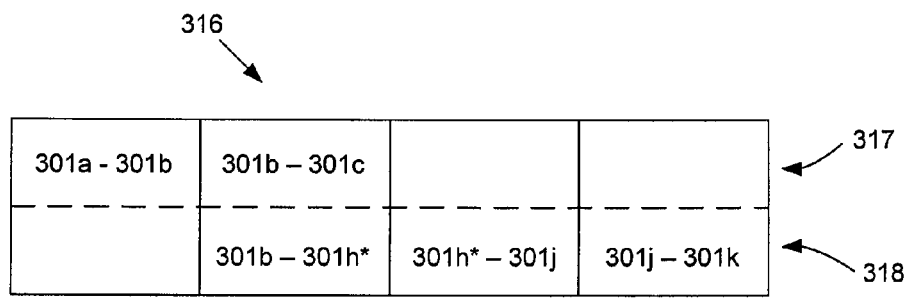
FIG. 3F

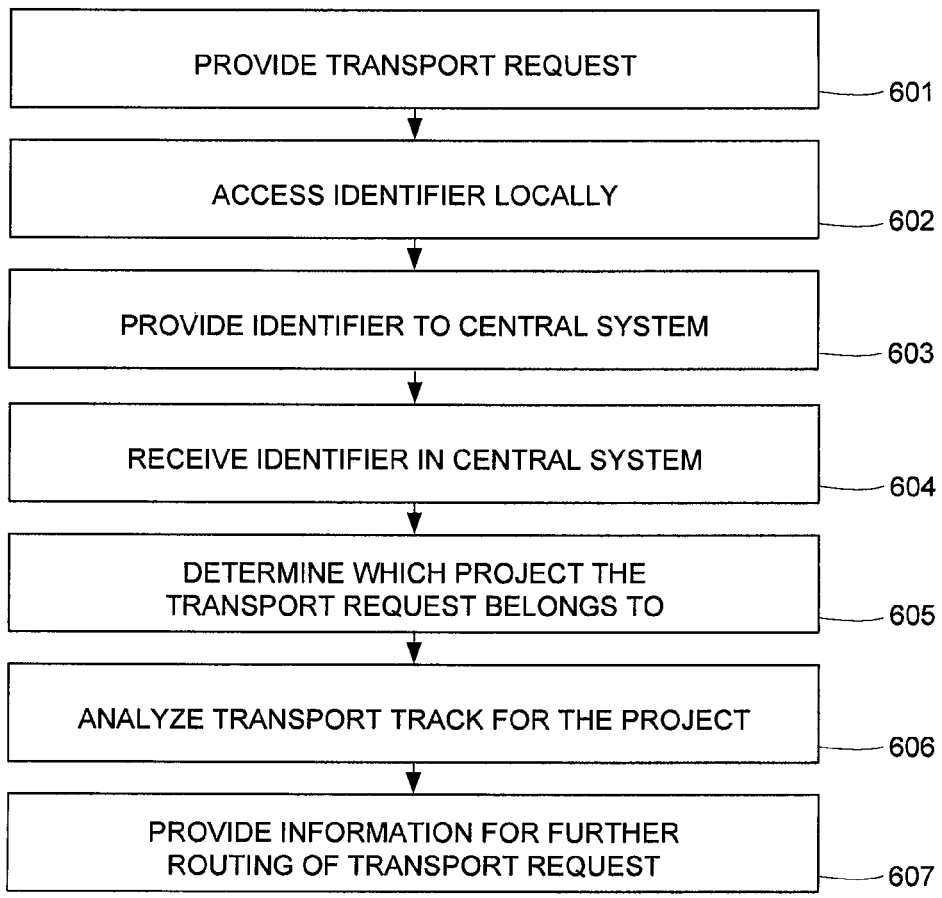

METHOD FOR GENERATING A TRANSPORT TRACK THROUGH A SOFTWARE SYSTEM LANDSCAPE AND COMPUTER SYSTEM WITH A SOFTWARE SYSTEM LANDSCAPE AND A TRANSPORT TRACK

CLAIM OF PRIORITY

The present patent application claims the priority benefit of the filing date of European Application (EPO) No. 04 025 505.1 filed Oct. 27, 2004, which is incorporated herein by reference.

TECHNICAL FIELD

This application relates generally to servicing of a software system landscape by means of transport requests, and more particularly to a method for generating a transport track through a software system landscape and to a computer system with software system landscape and a transport track.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Rohrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

Software services that have been tested and approved in one system may be forwarded to subsequent systems via logical directional transport paths 105. For instance, a service approved in development system 101 is forwarded to the quality assurance system 102, and upon approval in the quality assurance system 102 further forwarded simultaneously to the training system 103 and both productive systems 104.

Servicing is often performed on a software service project basis. A software service project like adaptation of the software to new legislation may require servicing of a selection of systems of the system landscape only, e.g. the systems in one country only. As all systems simply forward the imported services to all other systems connected thereto, the operators of the systems that do not require servicing have to manually reject each and every service that is not intended for their system. This is time consuming and bears the risk of errors, in particular given the considerable number of services that are typically required during the lifetime of a project. An automated way presently is to change system changeability parameters of each system on a project basis, e.g. to specify in each system whether it accepts services corresponding to a particular project. This, too, is time consuming and bears the risk of errors as it requires authorized access to and configuration of each system.

The operator also has to assure that the services are imported in the correct order. The importance of the correct order is illustrated in FIG. 2a and FIG. 2b. An original version 201 of the software and data is first modified by a first service 202, resulting in modified version 203, and subsequently by a second service 204, resulting in modified version 205, cf. FIG. 2a. However, if the second service 204 is imported before the first service 202, the original version 201 is changed into modified version 206 by the second service 204 and subsequently into modified version 207 by the first service 202, cf. FIG. 2b. The modified versions 205 and 207 differ and the version 207 will not perform as intended.

In view of the fact that an SAP R/3 implementation may comprise dozens of systems and require thousands of services per month during project development and implementation, the operator time required becomes considerable as does the risk for errors to occur.

SUMMARY

In one aspect of the invention, a method is provided for generating a transport track for routing transport requests through a software system landscape comprising a central control system and a plurality of logical systems interconnected by logical transport paths, a transport request defining a software service to at least one of the code and the data of a system in the landscape, the method comprising the steps of: selecting a group of systems for a software service project according to a project definition; analyzing in the central system the transport paths between the systems of the group for finding a suitable route through all systems of the group; and generating in the central system a transport track according to the analysis, the transport track defining a route for transport requests through all systems of the group in a particular order, the transport track specifying one source system in which software services are permitted, pairs of adjacent interconnected systems, and at least one target system.

In a further aspect of the invention, a computer system is provided comprising: a central control system; a plurality of logical systems; logical transport paths that interconnect the logical systems to form a software system landscape, the logical transport paths allowing a transport request to be transported from one system into another system, a transport request defining a software service to at least one of the code and the data of a system in the landscape; means for selecting a group of systems for a software service project according to a project definition; means for analyzing in the central system the transport paths between the systems of the group for finding a suitable route through all systems of the group; and means for generating in the central system a transport track according to the analysis, the transport track defining a route for transport requests through all systems of the group in a particular order, the transport track specifying one source system in which software services are permitted, pairs of adjacent interconnected systems, and at least one target system.

In a still further aspect of the invention, a computer program product is provided, the computer program product comprising on a storage medium a computer code that upon execution on a computer system performs the method according to the invention.

BRIEF DESCRIPTION OF THE DRAWINGS

Further embodiments of the invention are inferable from the following description and the claims.

FIG. 3B illustrates a transport request as known in the art.

FIG. 3C illustrates a central system according to an example embodiment of the invention.

FIG. 3D illustrates a list with systems belonging to a project according to an example embodiment of the invention.

FIGS. 3E, 3F each illustrate a transport track according to an example embodiment of the invention.

FIGS. 5, 6 each show a flow diagram of a method according to an example embodiment of the invention.

DETAILED DESCRIPTION

Figure 1:
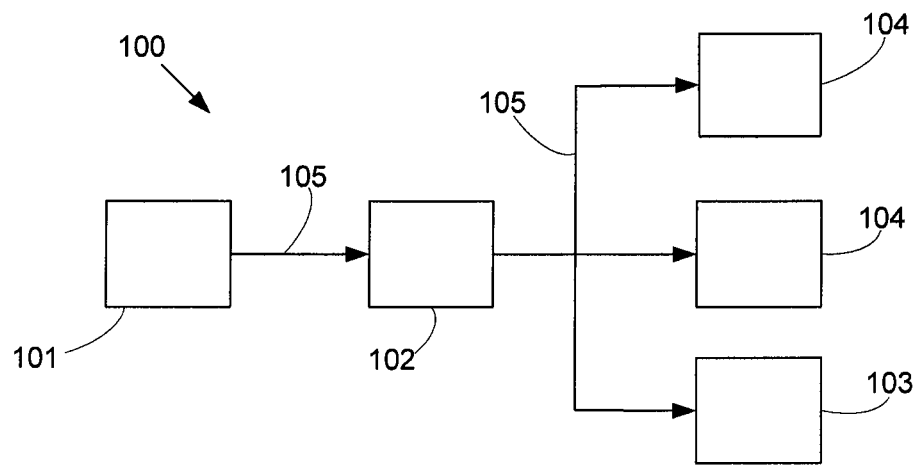
FIG. 1 shows a system landscape of the prior art.
Figure 2:
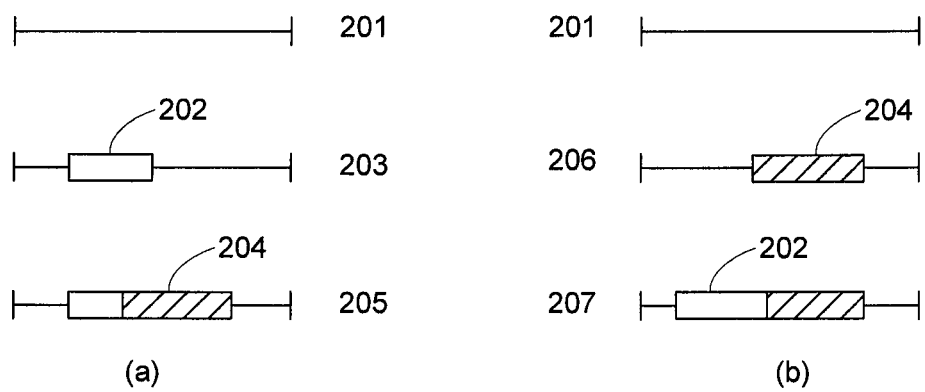
FIG. 2a and 2b illustrate services performed in different orders according to the prior art.
Figure 3A:
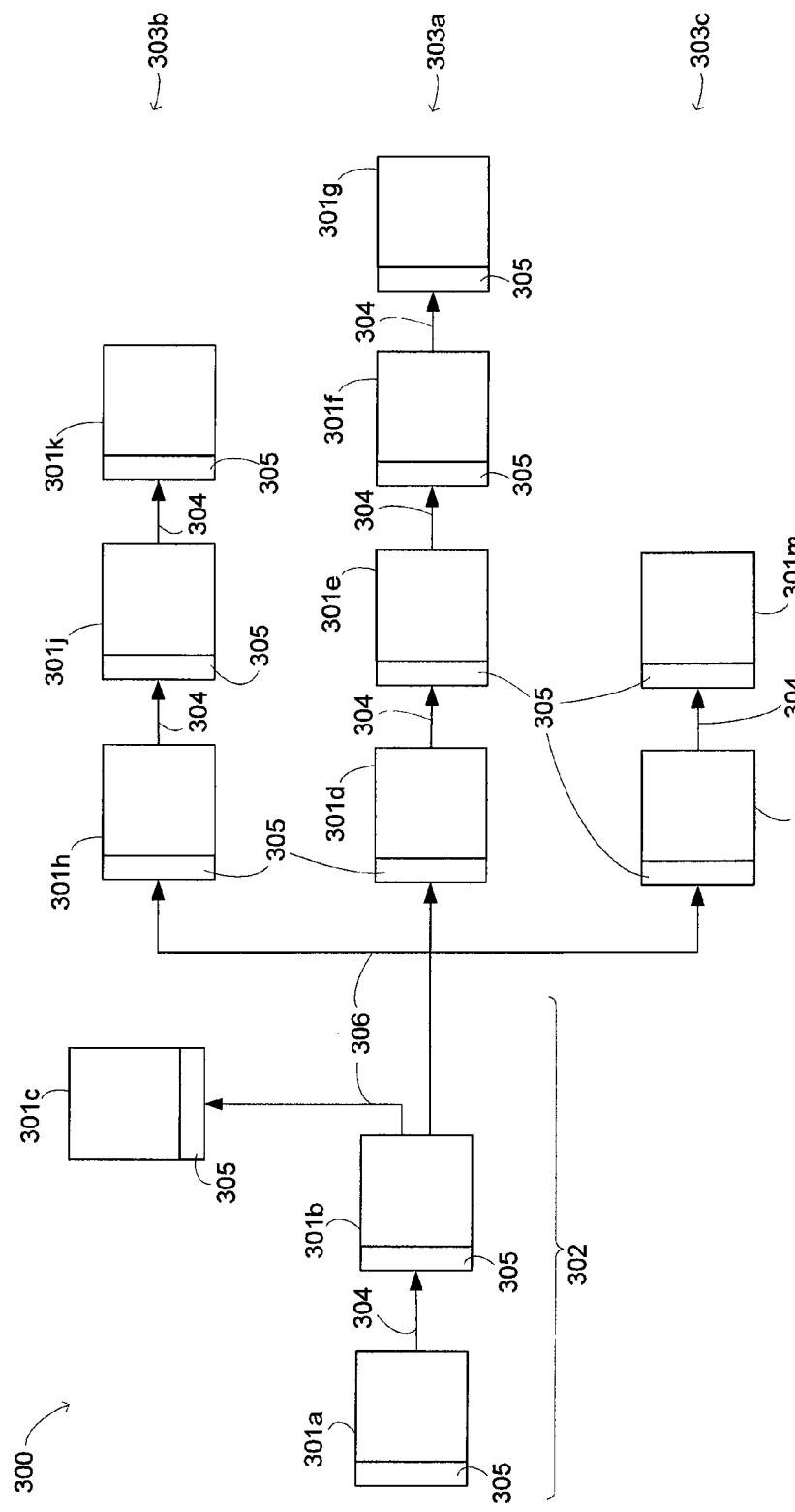
FIG. 3A illustrates a system landscape according to an example embodiment of the invention.

The example embodiment shown in FIG. 3A shows an SAP R/3 Release 4.5 system landscape 300 with separate logical systems 301 that are here divided into a global part 302, e.g. at a main development and production facility, and local parts 303a, 303b, 303c, e.g. at other production facilities.

The global part 302 comprises at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is localized in a different country than the global part 302. The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may differ according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

The logical systems 301 are connected via logical directional transport paths 304. The transport paths 304 may provide 1:n, 1:1 or n:1 connections between systems 301, cf. e.g. system 301b and systems 301c, 301h, 301d, 301l, system 301a and system 301b, and systems 301e, 301l and system 301m, respectively. Each transport path 304 terminates in an import buffer 305 of a system 301.

The transport paths 304 serve as a network for the distribution of software services. A service may for example relate to customization of a system 301, e.g. a selection of predefined functionality in the system 301, or an adaptation of a system 301, e.g. an addition of or amendment to functionality, or to program and data updates or the like. A software service is typically provided in form of a transport request 306, cf. FIG. 3B. The transport request 306 is structured data comprising a unique identifier 307, e.g. DEVK900251, general information 308 regarding the service, e.g. indicating that the service is a program patch, and service data 309, e.g. a piece of program code for a patch.

A central control system 310 is provided, cf. FIG. 3C, that has access to transport path layout information 311 and to service project data 312, in form of a list that defines a group of systems 301 affected by a software service project. The group may comprise any number of systems 301 and in particular all systems 301 and one of the systems 301.

An exemplary list 313 is illustrated in FIG. 3D. The list 313 defines a group comprised of the systems 301a, 301b, 301c, 301h, 301j, 301k. Entry 301h is marked to indicate that 301h is a pass-through-system, e.g. no import into system 301h is allowed. This effectively bypasses system 301h, e.g. for cases where no further development work is required in the part 303b to adapt the software service originating from development system 301a in the global part 302. More than one entry may be marked according to the project specification.

A program 310 is provided in the central system 314 for analyzing the layout information 311 and the project data 312 and for providing a transport track 315 that defines a route for transport requests 306 through all systems 301 of the project group in a particular order. There may be more than one transport track per system landscape, and one or more transport tracks may being assigned to a project context like a development project for the local part 303a only or a documentation project for the global part 302 only etc.

An exemplary transport track 315 corresponding to the list 313 is illustrated in FIG. 3E and comprises a sequential list of system identifiers for pairs of interconnected systems 301. The list comprises the entries: 301a-301b, 301b-301c, 301b-301h*, 301h*-301j, 301j-301k. A transport request will be forwarded through the systems in the list according to this order, one step at a time upon approval, e.g. upon approval in 301a from 301a to the input buffer of 301b, then upon approval of an import into 301b from 301b to the input buffer of 301c, then upon approval of an import into 301c from 301b to the input buffer of 301h, then from 301h to the input buffer of 301j, and finally upon approval of an import into 301j from 301j into the input buffer of 301k.

An alternative transport track 316 corresponding to the list 313 is illustrated in FIG. 3F. Here, the second entry in the list comprises the two pairs 301b-301c and 301b-301h*. This divides the transport track into an upper and a lower part 317, 318, along which transport requests 306 are forwarded independently. Upon approval in system 301b, a transport request is forwarded simultaneously to the input buffer of system 301c and the input buffer of system 301h. The transport request may then be forwarded to the system 301j immediately without first waiting for approval of an import into system 301c.

The systems 301 of each part 302, 303a, 303b, 303c and the central system 310 may be located and simultaneously executed in a single computer, but are distributed across separate hardware. Preferably, the global part 302 and the local parts 303a, 303b, 303c each run on physically separate computer systems, which themselves may comprise different computers.

Figure 4:
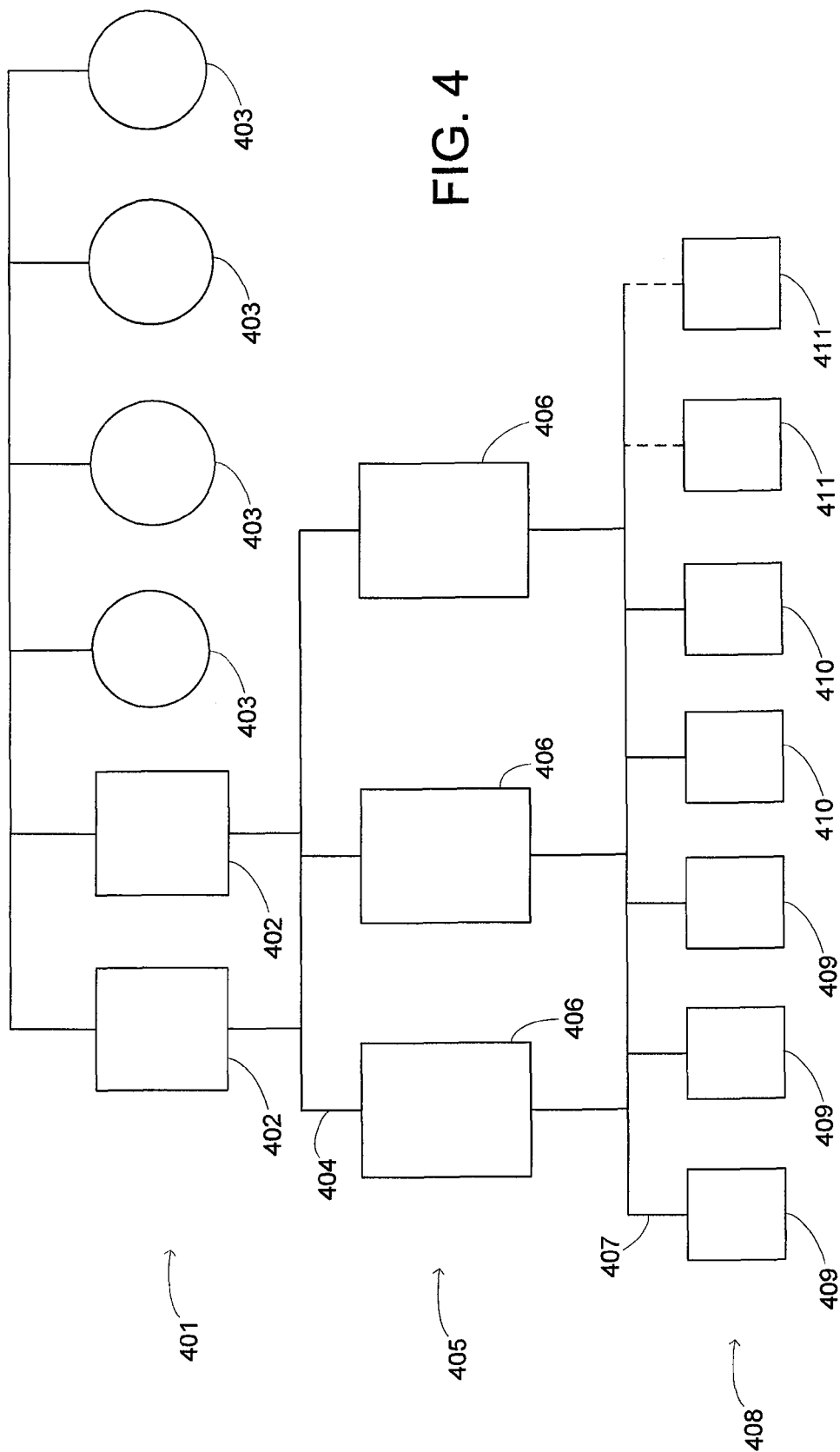
FIG. 4 shows an example embodiment of the hardware of a computer system according to the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 comprises dumb terminals 409, Personal Computers 410 and/or wireless access devices 411 like PDAs.

The method according to an example embodiment of the invention is now described with reference to FIGS. 5, 6 and 3.

Turning first to FIG. 5, a group of systems is selected 501 that belong to a software service project. The central system 310 then analyzes 502 the transport paths 304 between the systems 301 of the group. The analysis comprises the steps of finding the source system of the group, and the shortest and/or fastest route that connects all systems. The central system 310 then generates 503 a transport track that defines a route for transport requests through all systems of the group in a particular order, the transport track specifying one source system in which software services are permitted, pairs of adjacent interconnected systems, and at least one target system. The transport track may have branches along which transport requests are forwarded independently. There may be more than one transport track per system landscape, each transport track being assigned to a project context like a development project for the local part 303a only or a documentation project for the global part 302 only etc.

The routing of transport requests is effected by the program 314 in the central system 310. The program 314 communicates with the systems 301 to inform them via which transport paths 304 to forward a transport request 306. The systems 301 contact the central system 310 upon approval of an import, and inquire about the further route for the imported transport request 306. This is exemplifies in the embodiment of FIG. 6. A transport request 306 is provided 601 in a source system, e.g. the development system 301a of the global part 302. The system 301a accesses 602 the identifier 307 of the transport request 306, and provides 603 the identifier 307 in a predefined format to the central system 310. The central system 310 receives 604 the identifier 307, determines 605 which project the transport request 306 belongs to, analyzes 606 the transport track 315 for the project, and informs 607 the system 301a which system to forward the transport request 309 to.

Although the foregoing has been a description of an example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method to determine a transport track for routing transport requests through a software system landscape comprising a central control system and a plurality of logical systems interconnected by logical transport paths, a transport request defining a software service for customization, adaptation, program or data update of a system to at least one of the code and the data of a system in the landscape, the method comprising:
    selecting a group of systems for a software service project according to a project definition;
    determining, using one or more computers in the central system a transport track, the transport track defining a route for transport requests through all systems of the group in a particular order, the transport track specifying one source system in which software services are permitted, adjacent interconnected systems, and at least one target system;
    defining by the software service project a group of systems for which the software service is required;
    analyzing, wholly within the central system, the transport paths between the systems of the group for finding a suitable route through all systems of the group by accessing transport layout information of the software system landscape and project data by the central control system, the transport paths being for the delivery of the software services, the software services being software executables;
    analyzing, wholly within the central system, whether further development work is required in a local part to adapt the software service for the local part; and
    generating the transport track in the central system in accordance with the analyzing of the transport paths.

2. The method of claim 1, wherein generating of the transport track comprises generating a sequential list of identifiers for pairs of interconnected systems, the list starting with a pair comprising the source system.

3. The method of claim 1, wherein generating of the transport track comprises generating a sequential list of identifiers for pairs of interconnected systems, the list comprising an entry with pairs that define a branch.

4. The method of claim 1, further comprising:
    providing a transport request for the project; and
    routing the transport request from the source system through the systems of the group via the transport paths and in the order defined by the transport track.

5. The method of claim 1, wherein the central system communicates with the systems of the group of systems to effect the routing according to the transport track.

6. A computer system comprising:
    a central control system including one or more computers;
    a plurality of logical systems;
    logical transport paths that interconnect the logical systems to form a software system landscape, the logical transport paths allowing a transport request to be transported from one system into another system, the transport request defining a software service to at least one of the code and the data of a system in the landscape:
    means for selecting a group of systems for a software service project according to a project definition;

means for analyzing, wholly within the central control system, the transport paths between the systems of the group for finding a suitable route through all systems of the group by accessing transport layout information of the software system landscape and project data by the central control system, the transport paths being for delivery of software services, the software services being software executables;

means for analyzing, wholly within the central control system, whether further development work is required in a local part to adapt the software service for the local part; and means for generating in the central control system a transport track according to the analysis, the transport track defining a route for transport requests through all systems of the group in a particular order, the transport track specifying one source system in which the software services are permitted, adjacent interconnected systems, and at least one target system.

7. The computer system of claim 6, wherein the transport track comprises a sequential list of identifiers for pairs of interconnected systems, the list starting with a pair comprising the source system.

8. The computer system of claim 6, wherein the transport track comprises a sequential list of identifiers for pairs of interconnected systems, the list comprising an entry with pairs that define a branch.

9. The computer system of claim 6, further comprising a transport request for the project; and means for routing the transport request from the source system through the systems of the group via the transport paths and in the order defined by the transport track.

10. The computer system of claim 6, further comprising means for communication between the central system and the systems of the group of systems to effect the routing according to the transport track.

11. A tangible computer program product comprising on a storage memory, a computer code, the computer program product having no transitory signal components, the computer code that upon execution on a computer system performs a method to determine a transport track for routing transport requests through a software system landscape comprising a central control system and a plurality of logical systems interconnected by logical transport paths, a transport request defining a software service for customization, adaptation, program or data update of a system to at least one of the code and the data of a system in the landscape, the method comprising:

selecting a group of systems for a software service project according to a project definition;

determining, using one or more computers in the central system a transport track, the transport track defining a route for transport requests through all systems of the group in a particular order, the transport track specifying one source system in which software services are permitted, adjacent interconnected systems, and at least one target system;

defining by the software service project a group of systems for which the software service is required;

analyzing, wholly within the central system, the transport paths between the systems of the group for finding a suitable route through all systems of the group by accessing transport layout information of the software system landscape and project data by the central control system, the transport paths being for delivery of the software services, the software services being software executables;

analyzing, wholly within the central system, whether further development work is required in a local part to adapt the software service for the local part; and generating the transport track in the central system in accordance with the analyzing of the transport paths.

12. A computer system comprising:

a central control system including one or more computers;

a plurality of logical systems;

logical transport paths that interconnect the logical systems to form a software system landscape, the logical transport paths allowing a transport request to be transported from one system into another system, a transport request defining a software service to at least one of the code and the data of a system in the landscape;

a selector to select a group of systems for a software service project according to a project definition;

an analyzer to analyze, wholly within the central control system, the transport paths between the systems of the group to find a suitable route through all systems of the group by accessing transport layout information of the software system landscape and project data by the central control system, the transport paths being for delivery of software services, the software services being software executables, the analyzer further to determine, wholly within the central control system, whether further development work is required in a local part to adapt the software service for the local part; and a generator to generate in the central system a transport track according to the analysis, the transport track defining a route for transport requests through all systems of the group in a particular order, the transport track specifying one source system in which the software services are permitted, adjacent interconnected systems, and at least one target system.

* * * * *